US009941696B2

United States Patent
Villanueva, Jr. et al.

(10) Patent No.: US 9,941,696 B2
(45) Date of Patent: Apr. 10, 2018

(54) ESTABLISHING COMMUNICATION AND POWER SHARING LINKS BETWEEN COMPONENTS OF A DISTRIBUTED ENERGY SYSTEM

(71) Applicant: CleanSpark Technologies LLC, Poway, CA (US)

(72) Inventors: Arturo N. Villanueva, Jr., Poway, CA (US); Jennifer M. Worrall, Poway, CA (US)

(*) Notice: Subject to any disclaimer, the term of this patent is extended or adjusted under 35 U.S.C. 154(b) by 0 days.

(21) Appl. No.: 14/885,627

(22) Filed: Oct. 16, 2015

(65) Prior Publication Data

US 2016/0043552 A1 Feb. 11, 2016

Related U.S. Application Data

(63) Continuation of application No. 14/666,177, filed on Mar. 23, 2015.

(60) Provisional application No. 61/975,829, filed on Apr. 6, 2014.

(51) Int. Cl.
*H02J 3/00* (2006.01)
*G05B 15/02* (2006.01)

(52) U.S. Cl.
CPC .............. *H02J 3/005* (2013.01); *G05B 15/02* (2013.01); *H02J 2003/003* (2013.01); *Y04S 10/54* (2013.01)

(58) Field of Classification Search
CPC ...... H02J 3/005; H02J 2003/003; G05B 15/02
See application file for complete search history.

(56) References Cited

U.S. PATENT DOCUMENTS

| | | |
|---|---|---|
| 6,751,562 B1 | 6/2004 | Blackett et al. |
| 6,882,904 B1 | 4/2005 | Petrie et al. |
| 6,944,555 B2 | 9/2005 | Blackett et al. |
| 7,216,043 B2 | 5/2007 | Ransom et al. |
| 7,183,667 B2 | 7/2007 | Colby et al. |
| 7,456,523 B2 | 11/2008 | Kobayashi |
| 7,489,990 B2 | 2/2009 | Fehr et al. |
| 7,577,005 B2 | 8/2009 | Angerer et al. |
| 7,582,986 B2 | 9/2009 | Folkers et al. |
| 7,652,394 B2 | 1/2010 | Hirst |
| 7,734,380 B2 | 6/2010 | Ransom et al. |
| 7,787,272 B2 | 8/2010 | Lasseter et al. |
| 7,834,479 B2 | 11/2010 | Capp et al. |
| 7,839,027 B2 | 11/2010 | Shelton et al. |
| 7,881,814 B2 | 2/2011 | Pearson et al. |
| 7,899,632 B2 | 3/2011 | Fornage et al. |
| 8,008,804 B2 | 8/2011 | Capp et al. |

(Continued)

OTHER PUBLICATIONS

C.M. Colson, "Algorithm for Distributed Decision-Making for Multi-agent Microgrid Power Management", IEEE 2011.*

*Primary Examiner* — Carlos Ortiz Rodriguez
(74) *Attorney, Agent, or Firm* — Warren M. Pate; Pate Peterson, PLLC

(57) ABSTRACT

Disclosed herein is a method and system for sharing power or energy across various power supply and control modules. More specifically, disclosed herein are systems and methods for distributing energy. As explained herein, the method discloses receiving, at a microgrid, data from a plurality of data sources. The data is then analyzed to forecast power needs associated with the microgrid. Using the data, the microgrid may determine whether and when to share power with the requesting module.

20 Claims, 4 Drawing Sheets

(56) References Cited

U.S. PATENT DOCUMENTS

| | | |
|---|---|---|
| 8,019,697 B2 | 9/2011 | Ozog |
| 8,060,259 B2 | 11/2011 | Budhraja et al. |
| 8,068,938 B2 | 11/2011 | Fujita |
| 8,234,876 B2 | 8/2012 | Parsonnet et al. |
| 8,321,194 B2 | 11/2012 | Meagher et al. |
| 8,364,609 B2 | 1/2013 | Ozog |
| 8,415,830 B2 | 4/2013 | Lim et al. |
| 8,433,452 B2 | 4/2013 | Fleck et al. |
| 8,519,568 B2 | 8/2013 | Langel |
| 8,527,252 B2 | 9/2013 | Kephart et al. |
| 8,528,345 B2 | 9/2013 | Parsonnet et al. |
| 8,566,266 B2 | 10/2013 | Nikovski et al. |
| 8,626,351 B2 | 1/2014 | Hirato et al. |
| 8,653,692 B2 | 2/2014 | Batzler et al. |
| 8,666,520 B2 | 3/2014 | Kucinskas et al. |
| 8,706,309 B2 | 4/2014 | Schweitzer et al. |
| 8,751,036 B2 | 6/2014 | Darden et al. |
| 8,816,531 B2 | 8/2014 | Krok et al. |
| 8,831,788 B2 | 9/2014 | Flynn et al. |
| 8,831,789 B2 | 9/2014 | Weatherhead et al. |
| 8,842,456 B2 | 9/2014 | Kuo et al. |
| 8,855,792 B2 | 10/2014 | Landgraf |
| 8,862,279 B2 | 10/2014 | Darden et al. |
| 9,020,650 B2 | 4/2015 | Lutze et al. |
| 9,031,707 B2 | 5/2015 | Park et al. |
| 9,088,180 B2 | 7/2015 | Wedel et al. |
| 2012/0104847 A1 | 5/2012 | Roscoe et al. |
| 2012/0116602 A1 | 5/2012 | Vaswani et al. |
| 2012/0310438 A1 | 12/2012 | Kaiser |
| 2013/0085624 A1 | 4/2013 | Yang et al. |
| 2013/0198847 A1 | 8/2013 | Sampigethaya |
| 2013/0253718 A1 | 9/2013 | Meagher et al. |
| 2013/0270908 A1 | 10/2013 | Wedel et al. |
| 2014/0025217 A1 | 1/2014 | Jin et al. |
| 2014/0091622 A1 | 4/2014 | Lucas et al. |
| 2014/0097683 A1 | 4/2014 | Piyabongkarn et al. |
| 2014/0111006 A1 | 4/2014 | Baldassarre et al. |
| 2014/0148960 A1 | 5/2014 | Bhageria et al. |
| 2014/0229031 A1 | 8/2014 | Amarin et al. |
| 2014/0249686 A1 | 9/2014 | Brainard et al. |
| 2014/0277599 A1 | 9/2014 | Pande et al. |
| 2014/0371936 A1 | 12/2014 | Kamel et al. |
| 2014/0379156 A1 | 12/2014 | Kamel et al. |
| 2015/0039145 A1 | 2/2015 | Yang et al. |
| 2015/0112501 A1 | 4/2015 | Rombouts et al. |
| 2015/0288183 A1 | 10/2015 | Villanueva, Jr. et al. |

* cited by examiner

ESTABLISHING COMMUNICATION AND POWER SHARING LINKS BETWEEN COMPONENTS OF A DISTRIBUTED ENERGY SYSTEM

CROSS-REFERENCE TO RELATED APPLICATIONS

This application is a continuation of U.S. patent application Ser. No. 14/666,177, filed Mar. 23, 2015, and titled "Establishing Communication and Power Sharing Links Between Components of a Distributed Energy System," which is a nonprovisional patent application of and claims the benefit of priority to U.S. Provisional Patent Application No. 61/975,829, filed Apr. 6, 2014, and titled "Fractalgrids and Fractalhives," the disclosures of which are hereby incorporated herein by reference in their entirety.

TECHNICAL FIELD

The present disclosure is directed to providing and sharing power between various components of a distributed energy system. More specifically, embodiments of the present disclosure are directed to microgrids in a distributed energy system that may share and receive power and information with other components or microgrids within the distributed energy system based on current and/or forecasted power needs.

BACKGROUND

Conventional power stations supply energy and power to a number of homes, businesses, cities, municipalities, counties and so on. Typically, these power stations are in a central location and, as a result, must transmit power, in the form of electricity, over long distances. As electricity travels over such distances, some of the power is lost. Accordingly, what is needed is a scalable distributed energy system that may be located close to one or more loads that require the power provided by the distributed energy system.

It is with respect to these and other general considerations that embodiments have been made. Although relatively specific problems have been discussed, it should be understood that the embodiments should not be limited to solving the specific problems identified in the background.

SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter.

Embodiments disclosed herein are directed to a system and method for providing data and energy links between various nodes of a distributed energy system. More specifically, embodiments of the present disclosure are directed to components of a distributed energy system that provide power or serve as a load to other components of the distributed energy system based on a defined set of rules.

For example and as will be described below, the embodiments described herein are directed to receiving, at a microgrid, data from a plurality of data sources. The received data is analyzed to determine and/or forecast power needs of various components associated with or otherwise dependent on the microgrid. Using the data, the microgrid may determine whether and when to share power with the requesting component. In some embodiments, the requesting component may be a child microgrid, a parent microgrid or other component or module that requests or otherwise requires power. Such examples include energy storage modules, energy generation modules, energy sinks or loads, sensors and so on.

BRIEF DESCRIPTION OF THE DRAWINGS

Embodiments of the present disclosure may be more readily described by reference to the accompanying drawings in which like numbers refer to like items and in which.

DETAILED DESCRIPTION

Figure 1:
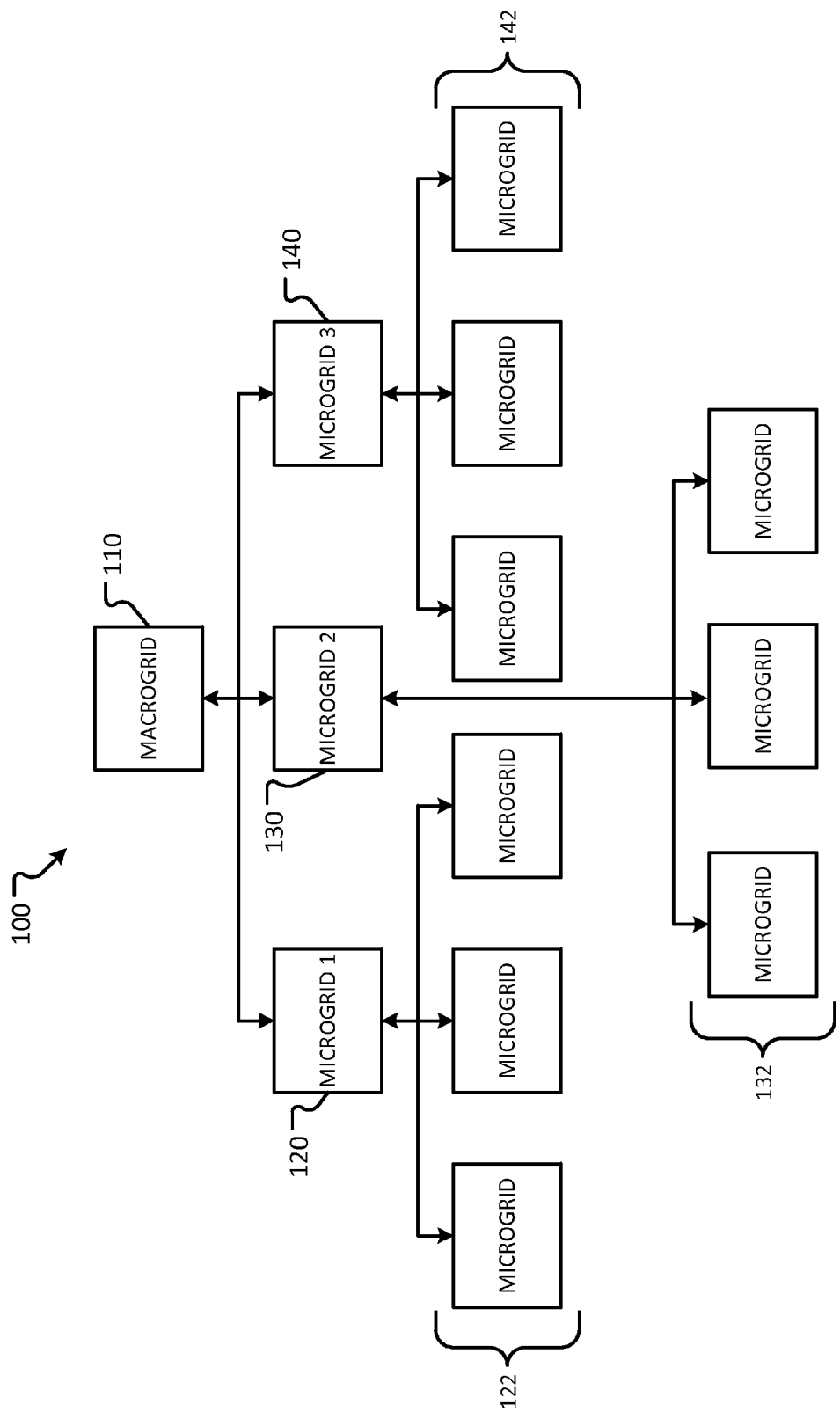
FIG. 1 illustrates an exemplary distributed energy system according to one or more embodiments of the present disclosure.

Various embodiments are described more fully below with reference to the accompanying drawings, which form a part hereof, and which show specific embodiments for practicing the embodiments described herein. However, various embodiments may be implemented in many different forms and should not be construed as limited to the embodiments set forth herein; rather, these embodiments are provided so that this disclosure will be thorough and complete, and will fully convey the scope of the invention to those skilled in the art. Embodiments may be practiced as methods, systems or devices. Accordingly, embodiments may take the form of a hardware implementation, an entirely software implementation or an implementation combining software and hardware aspects.

In mathematics, a fractal is a mathematical set that exhibits a repeating or closely-repeating pattern. The pattern also displays the same architecture at every scale. This concept of fractals is extended herein to define a distributed energy system known as a FRACTALGRID. A FRACTALGRID is a type of distributed and networked microgrid architecture in which a larger microgrid is comprised of smaller microgrid nodes or fractal units. Each microgrid or fractal unit has self-similar attributes that enable interoperability with other microgrids and also enable various microgrids to be integrated into a similar, often larger architecture with ease.

Because each microgrid in a system may be similar or otherwise have similar structure and/or components, information may be easily shared between microgrids. For example, cybersecurity information may be shared among the microgrids at all levels throughout similar patterns, resulting in inherent similar behaviours.

A FRACTALGRID may provide a reliable source of electricity generation as the FRACTALGRID is configured to integrate locally-available renewable resources. More specifically, the FRACTALGRID may utilize localized renewable resources for electricity generation and can also integrate renewable energy with the local utility grid via semi-autonomous controls that may enhance the ability of a consumer to maintain energy delivery during outage events or shortfalls in energy availability. This capability, combined with a cybersecure information-sharing platform, greatly enhances energy security and reliability.

In some implementations a microgrid may be more resilient to adverse grid conditions such as voltage and frequency anomalies and power outages than conventional power grids or subsystems of conventional power grids. For example, when such adverse grid conditions or events are detected, the microgrid is capable of disconnecting from the utility grid and autonomously sustaining power for minutes to weeks depending upon local distributed resource generation, energy storage, and intelligent energy management strategies. The microgrid can also detect the recovery of normal grid behavior and reconnect for normal parallel operation after syncing reference voltage and frequency.

In addition to the above, a microgrid may have many operational modes and operational sub-modes. Some of these include, but are not limited to peak-shaving, load-shifting, and load-leveling. These operational modes may allow consumers or other users to offset energy and power consumption from the utility through locally produced renewable energy and energy storage.

In light of the above, embodiments described herein are directed to distributed energy systems and more particularly to enabling one or more components of a distributed energy system to communicate with other components of the distributed energy system. In addition to enabling the various components of the distributed energy system to communicate with one another, embodiments described herein also enable the various components of the distributed energy system to share power with other components of the system. As will be explained below, the sharing of power may be based on a defined set of rules or priorities that is commonly shared among the different components of the distributed energy system.

The distributed energy system described herein may include one or more microgrids. As described above, a microgrid is an electrical system that is configured to locally generate, store and distribute power. Examples of microgrids include, but are not limited to renewable energy sources such as solar power, wind power, geothermal power, hydro power, electrical transfer switches, energy generation modules, energy storage modules, loads, local sensors and so on. Microgrids can function independently and may also be connected to large electrical grids or macrogrids. That is, a microgrid can not only generate its own power, but it can both receive power from a macrogrid and provide power to a macrogrid. In addition to the above, a microgrid can receive requests for power from other components in the distributed energy system, and determine, based on historical, current and/or forecasted power needs, whether and when to share power with the requesting components.

FIG. 1 illustrates an exemplary distributed energy system 100 according to one or more embodiments of the present disclosure. As shown in FIG. 1, the distributed energy system 100 may include a number of different components or modules that are communicatively and/or electrically coupled together. This coupling may enable each component within the distributed energy system 100 to share data and/or power with other components of the distributed energy system 100.

More specifically, and as shown in FIG. 1, the distributed energy system 100 includes a macrogrid 110. As briefly explained above, the macrogrid 110 may be a centralized power grid such as a power station that is configured to generate or otherwise provide power to various locations, components, loads, modules and the like. Exemplary power stations include nuclear power plants, coal-fired power plants, hydroelectric dams, large scale solar panels/plants and so on.

In some embodiments, the macrogrid 110 may be electrically and/or communicatively coupled to one or more child microgrids such as shown in FIG. 1. The link between the microgrids and the macrogrid 110 enables the macrogrid 110, and each of the microgrids in the distributed energy system 100, to share data and power with each member in its family tree. That is, power may be transmitted from one parent microgrid in the distributed energy system 100 to one or more child microgrids and so on. Likewise, power may be provided from a child microgrid to a parent microgrid.

For example and as shown in FIG. 1, macrogrid 110 is communicatively and/or electrically coupled to microgrid 1 120, microgrid 2 130 and microgrid 3 140. Such a coupling enables the macrogrid 110 to share power and data with, and receive power and data from, each of microgrid 1 120, microgrid 2 130 and microgrid 3 140. Likewise, the coupling of the components of the distributed energy system 100 enables each microgrid to communicate and share power with other microgrids in the distributed energy system 100.

For example, as shown in FIG. 1, microgrid 1 120 has a plurality of child microgrids 122, microgrid 2 130 has a plurality of child microgrids 132 and microgrid 3 140 has a plurality of child microgrids 142. Each family of microgrids in the distributed energy system 100 may be configured to communicate and share power with other microgrids in its family. That is, microgrid 1 120 may share power with and receive power from one or more of its child microgrids 122. Likewise, microgrid 1 120 may share power and data with and/or receive data and power from microgrid 2 130 and/or child microgrids 132.

Although each microgrid is shown having multiple child microgrids, such a configuration is not required. That is, a microgrid may have no children or many children. Likewise, children may be removed or added as new microgrids become available or are otherwise discoverable by a particular microgrid or macrogrid. Regardless of the number of child microgrids a given microgrid may have, power and data may be shared between parent and child and child and parent.

In some embodiments, the sharing of data and/or power between sibling microgrids may be accomplished through the parent microgrid although this is not required. For example, if microgrid 1 120 requests power and/or data from microgrid 2 130, the power and/or data would be sent to the requesting microgrid via macrogrid 110.

The size of the distributed energy system 100 may be scalable. More specifically, the size of the system may change in real-time, substantially real-time or based on current and/or forecasted power needs. In addition, a single microgrid, or set of microgrids in a given system, may be configured to determine whether or not it wants to be absorbed or otherwise included with another larger (or smaller) system.

For example, a single microgrid may be configured to provide power or otherwise produce power to sustain a particular load (e.g., a house, a water pumping station, a cell phone tower etc.). This single microgrid can be aggregated into larger microgrids to sustain larger areas with larger power needs. In turn, these aggregated microgrids can be combined with otherwise aggregated into other microgrids that may supply power on yet a larger scale.

However, because each microgrid is a self-sustaining unit, the microgrid can determine whether it wants to be part of the larger system. For example, the microgrid may determine that based on historical, current and/or forecasted power usage of a load that it services, there is no benefit to the microgrid joining the larger system. In other embodiments, the microgrid may determine, based on received data or historical use data, that it will not have sufficient power to serve the load when requested. As such, the microgrid may join or otherwise request to join a larger distributed energy system. In still yet other embodiments, a parent (either a current parent, a former parent or a requesting parent microgrid) may request that the microgrid join and/or leave the distributed energy system 100. As such, the overall distributed energy system 100 may be scalable. Further, since each microgrid is autonomous the overall system may be maintained with rather low complexity.

Additionally, just as the distributed energy system may grow as described above, the system may also shrink when a system, or a component of the system, requires less power. That is, the size of the system may dynamically change in real-time or substantially real-time depending on current or forecasted power needs of the distributed energy system 100. In addition, a microgrid may be manually or automatically removed from the distributed energy system 100 in response to a perceived or actual threat (e.g., physical attack or a cyber-attack), reduced power generation (e.g., over a period of time) or when maintenance is to be or is being performed on the microgrid. Once the microgrid has been serviced or is otherwise operating as expected, the microgrid may again join the system (either automatically or manually).

Figure 2:
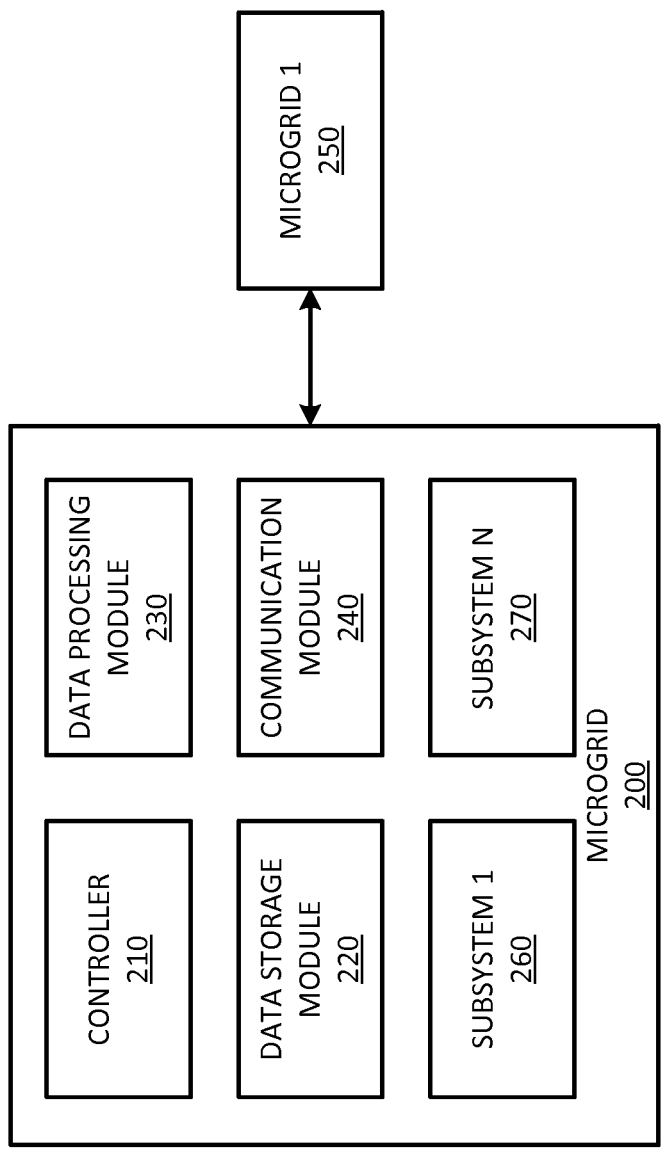
FIG. 2 illustrates an exemplary microgrid according to one or more embodiments of the present disclosure.

FIG. 2 illustrates an exemplary microgrid 200 according to one or more embodiments of the present disclosure. In some embodiments, the microgrid 200 may be part of or otherwise associated with one or more of the microgrids discussed above with respect to FIG. 1.

As discussed, a microgrid may be an autonomous unit that may be connected or disconnected (islanded) from a larger grid (such as a utility grid, another microgrid, a macrogrid or other such distributed energy system and so on) at any time. The microgrid 200 may interact with a parent microgrid and one or more child microgrids using various communication protocols. These communication protocols allow for the sharing of resources, including power and data, and also enables the microgrid to connect to and disconnect from parent microgrids, and/or child microgrids in cases of maintenance, emergencies, cyber-attacks, physical attacks and so on such as described above.

As shown in FIG. 2, the microgrid 200 may include a controller 210, a data storage module 220, a data processing module 230 and a communication module 240. Although shown separately, in some embodiments, some or all of these components may be combined into a single unit such as, for example, the controller 210.

In some embodiments, the controller 210 is a computing device or other such processing device that receives and processes requests and/or data. More specifically, the controller 210 may be a processor, a processing unit, a programmable logic controller, a remote terminal unit and may be configured to collect data, code the data into a format that is transmittable between various microgrids and transmit the data between the microgrids.

As also shown, a microgrid may include one or more subsystems such as, for example, subsystem 1 270 and subsystem N 280. These subsystems may include, but are not limited to, electrical transfer switches, energy generation modules, energy storage modules, loads, local sensors, and so on.

The controller 210 may include software, hardware or other logic and modules that determines energy resource management including, but not limited to which subsystems and microgrids need or are requesting power and whether the microgrid 200 itself should be connected to or disconnected from a distributed energy system. Because each microgrid includes a controller, each microgrid is an autonomous unit and it can perform or otherwise instruct various modules to act in accordance with the best interest of the microgrid and/or in the best interest of the subsystems the microgrid services.

For example, the microgrid 200 may receive data from another microgrid or another data source. The data may be received using the communication module 240 and stored in a data storage module 220. In some implementations, the communication module 240 may include an industrial control system (ICS) or supervisory control and data acquisition (SCADA) system that enables communication and power transfers between microgrids and/or subsystems.

Once the data is received, the data processing module 230 may process the data to determine current power needs of system serviced by the microgrid 200 and may also determine how much power the microgrid 200 is producing. In addition, the data processing module 230 may be able to forecast power requirements of the system and whether the power produced by the microgrid 200 can meet the power demands of the system.

For example, the controller 210 may be configured to determine whether it has, or has access to, the power that will be required by a particular system. If the microgrid 200 has access to sufficient power, that power may be provided to the requesting system over a communication and/or electrical connection. If the microgrid 200 does not have sufficient power, the controller 210 may communicate with other macrogrids or microgrids (e.g., microgrid 1 250) and request power from and/or request to join a distributed energy system associated with microgrid 1 250.

In some embodiments, the controller 210 may also be configured for energy management. More specifically, the controller 210 may be configured to determine a priority of power flow. That is, the controller 210 may be configured to provide power to various requesting modules in an ordered and systematic way. Table 1 below shows an exemplary preference chart in which a lower number indicates a higher priority power flow.

TABLE 1

| From | To | | | | |
|---|---|---|---|---|---|
| | Critical Loads | Non-Critical Loads | Local Energy Storage | Child Microgrid(s) | Parent Microgrid |
| Local (Renewable) Energy Sources | 1 | 6 | 6 | 12 | 16 |
| Local Energy Storage | 2 | 7 | N/A | 13 | 16 |
| Child Microgrid(s) | 3 | 8 | 10 | 14 | 16 |
| Parent Microgrid | 4 | 9 | 11 | 15 | N/A |
| Local (Non-Renewable) Energy Sources | 5 | N/A | N/A | N/A | N/A |

For example, when using the above priority chart, the microgrid 200, or other local renewable energy source, would first supply power to any requesting subsystem that has been identified as a critical load. If the local renewable energy source does not have enough power to meet the needs of the critical load, a local energy storage component or module may be used to satisfy the power demands of the critical load. Requests for power may then come from a child microgrid, a parent microgrid and finally a local, non-renewable energy source.

As discussed above, the determination of power requirements may be made in real-time or substantially real-time by the controller 210 in each microgrid 200. In addition, the controller 210 may use received data to forecast data usage of the critical load and/or other subsystems or components. For example, the microgrid 200 may determine that any excess energy (e.g., energy that is not needed by the critical load) should be stored in local storage rather than being supplied to non-critical loads (as shown in the chart above with each entry having priority 6) as peak energy usage of a critical load may be upcoming. In another implementation, the microgrid 200 may determine that power should be provided to non-critical loads prior to storing any excess power.

Although specific examples are discussed and shown in the table above, the priority of such a table may be customizable. In addition, each of the categories in the table below may be sub-divided into various sub-categories. For example, the non-critical load category may further be divided into a "sheddable" category and an "essential" category. If the non-critical load is categorized as sheddable, power may not be provided to the requesting system when there is a shortage of power. If the non-critical load is categorized as essential, the essential loads take priority over the sheddable loads. In some implementations, the each essential load may also be ordered or otherwise prioritized.

Further, although the microgrid 200 may determine whether and when to provide power to various requesting modules and components, each microgrid may also be customized and/or controlled by an operator. As such, an operator may manually set priorities and perform maintenance activities on each microgrid.

Figure 3:
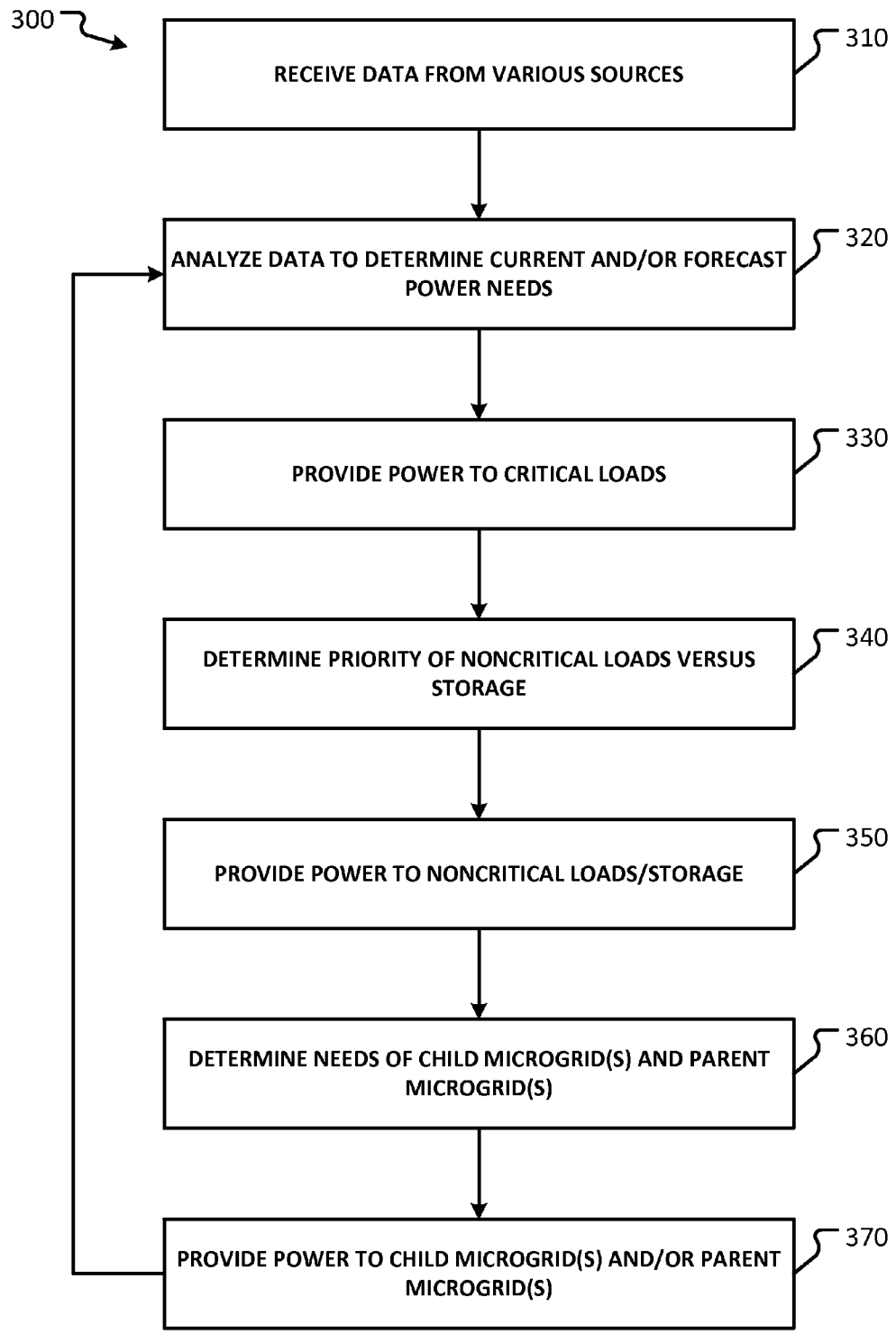
FIG. 3 illustrates an exemplary method for distributing energy according to one or more embodiments of the present disclosure.

FIG. 3 illustrates an exemplary method 300 for distributing energy among components of distributed energy system according to one or more embodiments of the present disclosure. In some embodiments, the method 300 may be used by one or more microgrids to determine how to provide or otherwise allocate power to various components and modules associated with or otherwise dependent on the microgrid. In some cases, some of the operations of the method 300 described below may occur simultaneously or substantially simultaneously. For example operation 320 and 330 may occur simultaneously or substantially simultaneously and operations 340 and 350 may occur simultaneously or substantially simultaneously. In addition, operation 310 may be occurring concurrently as previously received data is being processed by operations 320 through 370 are being performed.

Method 300 begins at operation 310 in which data is received from various sources. In some embodiments, the sources may include weather stations and power stations. In other implementations, the data may be received from one or more subsystems and/or microgrids associated with the microgrid. For example, a microgrid may receive data from one or more child microgrids or a parent microgrid. In some embodiments, the data may include historical weather patterns, current weather information, historical power usage, current power usage, current power generation, historical power generation and so on.

For example, in some embodiments, the data that is received may indicate power usage of one or more modules or components that draws power from the microgrid at certain times of the day when the temperature outside reaches various thresholds. In another example, the data may include current or historical usages of power on a weekend.

Once the data is received, flow proceeds to operation 320 and the data is analyzed to determine current and/or forecast energy needs. More specifically, the received data may be analyzed to determine current energy needs and/or amounts of energy that may be needed in the future. For example, if a microgrid is located on an office building on a weekend in which minimal power is being used, the data may be analyzed to determine that the microgrid typically has to request power from other microgrids come Monday morning. As a result, the microgrid may opt to store the generated power rather than provide it to other requesting microgrids or other subsystems.

In addition to the above, the microgrid may analyze the received data to determine whether it has sufficient power to provide its critical loads. If not, the microgrid may be configured to request power from a parent microgrid, a child microgrid, an energy storage module and/or a non-renewable energy source depending on its internal priority table such as described above.

In operation 330, the microgrid provides energy to its critical loads. As discussed above, the microgrid, acting as an autonomous unit, can determine in real-time or substantially real-time, whether it generates enough energy to satisfy its critical load requirements. If not, the microgrid may request power from other sources such as described above.

Flow then proceeds to operation 340 in which the microgrid determines a priority of noncritical load versus storage. As discussed above, using the received data, each microgrid may determine that it should store energy for upcoming requests rather than provide energy to non-critical loads. In other scenarios, the microgrid may determine that providing power to non-critical loads is, at the moment, more important than storing the power for subsequent use.

Flow then proceeds to operation 350 and the power is provided to the non-critical loads and/or a power storage module. As discussed above, the priority between the non-critical load and the storage may vary from time to time.

In operation 360, the microgrid may also be configured to determine power needs and/or requirements of one or more child microgrids and its parent microgrid. For example, the microgrid may be configured to receive data and/or power requests from child and parent microgrids. Once the data is received, the microgrid can determine whether and when to provide the requested power to the requesting microgrids.

If the microgrid determines that is has sufficient power or otherwise determines it wants to provide power to the requesting microgrids, flow proceeds to operation 370 and the microgrid provides the requested power to one or more child microgrids and to a parent microgrid. As discussed above, the priority between child microgrids and parent microgrids may be established using a priority table such as described above. The method 300 may then cycle back to operation 320 and the process may be repeated for another set of data.

Figure 4:
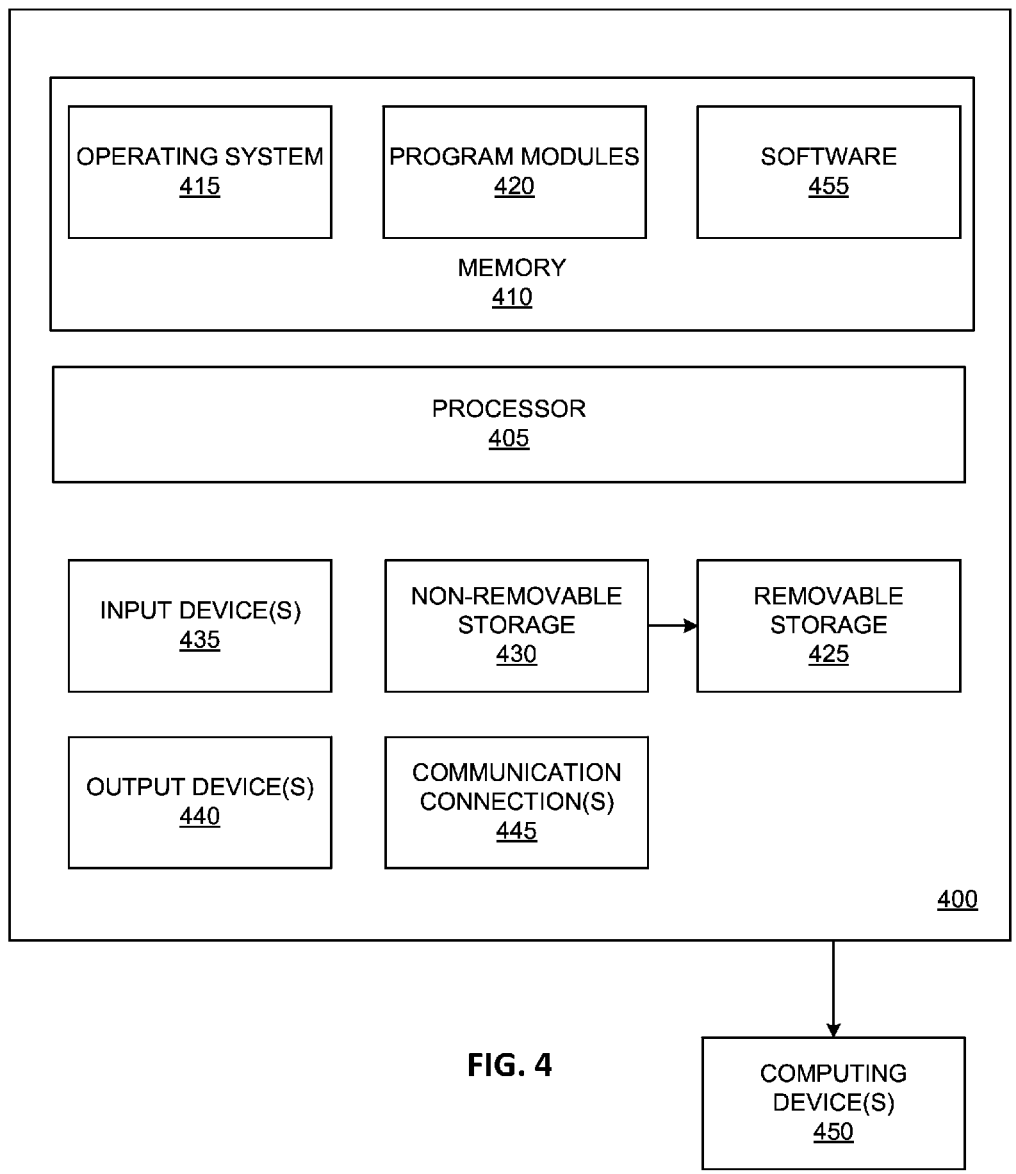
FIG. 4 is a block diagram illustrating physical components of an exemplary computing device that may be used with one or more embodiments of the present disclosure.

FIG. 4 is a block diagram illustrating exemplary components, such as, for example, hardware components of a computing device 400 according to one or more embodiments of the present disclosure. In certain embodiments, the computing device 400 may be part of a distributed energy system such as, for example, a component of the distributed energy system. For example, the computing device 400, or various components or modules of the computing device 400 may be part of or otherwise included with a microgrid. Although various components of the computing device 400 are shown, connections and communication channels between each of the components are omitted for simplicity.

In a basic configuration, the computing device 400 may include at least one controller or processor 405 and an associated memory 410. The memory 410 may include, but is not limited to, volatile storage such as random access memory, non-volatile storage such as read-only memory, flash memory, or any combination thereof. The memory 410 may store an operating system 415 and one or more program modules 420 suitable for running software applications 455. The operating system 415 may be configured to control the computing device 400 and/or one or more software applications 455 being executed by the operating system 415. The program modules 420 or software applications 455 may include modules and programs for requesting data, analyzing received data, determining the priority of energy requestors as well as providing communications between modules and components of the microgrid and/or other components and modules of a distributed energy system and so on.

The computing device 400 may have additional features or functionality than those expressly described herein. For example, the computing device 400 may also include additional data storage devices, removable and non-removable, such as, for example, magnetic disks, optical disks, or tape. Exemplary storage devices are illustrated in FIG. 4 by removable storage device 425 and a non-removable storage device 430.

In certain embodiments, various program modules and data files may be stored in the system memory 410. The program modules 420 and the processor 405 may perform processes that include one or more of the operations of method 300 shown and described with respect to FIG. 3.

As also shown in FIG. 4, the computing device 400 may include one or more input devices 435. The input devices 435 may include a keyboard, a mouse, a pen or stylus, a sound input device, a touch input device, and the like. The computing device 400 may also include one or more output devices 440. The output devices 440 may include a display, one or more speakers, a printer, and the like.

The computing device 400 also includes communication connections 445 that facilitate communications with additional computing devices 450. Such communication connections 445 may include internet capabilities, a RF transmitter, a receiver, and/or transceiver circuitry, universal serial bus (USB) communications, parallel ports and/or serial ports.

As used herein, the term computer readable media may include computer storage media. Computer storage media may include volatile and nonvolatile media and/or removable and non-removable media for the storage of information. Examples include computer-readable instructions, data structures, and program modules. The memory 410, the removable storage device 425, and the non-removable storage device 430 are all examples of computer storage media. Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 400. Any such computer storage media may be part of the computing device 400.

Embodiments of the present disclosure are described above with reference to block diagrams and operational illustrations of methods and the like. The operations described may occur out of the order as shown in any of the figures. Additionally, one or more operations may be removed or executed substantially concurrently. For example, two blocks shown in succession may be executed substantially concurrently. Additionally, the blocks may be executed in the reverse order.

The description and illustration of one or more embodiments provided in this disclosure are not intended to limit or restrict the scope of the present disclosure as claimed. The embodiments, examples, and details provided in this disclosure are considered sufficient to convey possession and enable others to make and use the best mode of the claimed embodiments. Additionally, the claimed embodiments should not be construed as being limited to any embodiment, example, or detail provided above. Regardless of whether shown and described in combination or separately, the various features, including structural features and methodological features, are intended to be selectively included or omitted to produce an embodiment with a particular set of features. Having been provided with the description and illustration of the present application, one skilled in the art may envision variations, modifications, and alternate embodiments falling within the spirit of the broader aspects of the embodiments described herein that do not depart from the broader scope of the claimed embodiments.

We claim:

1. A method for distributing energy, the method comprising:
   receiving, at a microgrid, data from a plurality of data sources;
   analyzing the data to forecast power needs associated with the microgrid;
   determining power generation capabilities of the microgrid;
   determining, based at least in part, on the forecasted power needs and the generation capabilities, whether the microgrid has an ability to provide power to one or more of a requesting parent microgrid, a requesting child microgrid, or a requesting subsystem;
   when it is determined that the microgrid has the ability to provide power, providing power from the microgrid to the one or more of the requesting parent microgrid, the requesting child microgrid or the requesting subsystem; and
   when it is determined that the microgrid does not have the ability to provide power, storing excess power generated by the microgrid in an energy storage device.

2. The method of claim 1, further comprising determining a priority of the one or more of the requesting parent microgrid, the requesting child microgrid, or the requesting subsystem.

3. The method of claim 2, further comprising providing power to the one or more of the requesting parent microgrid, the requesting child microgrid, or the requesting subsystem based on the determined priority.

4. The method of claim 1, further comprising determining, based at least in part, on the forecasted power needs and the generation capabilities, whether the microgrid can satisfy one or more power requirements.

5. The method of claim 4, further comprising causing the microgrid to request power from one or more of the parent microgrid or the child microgrid when it is determined that the microgrid cannot satisfy one or more power requirements.

6. The method of claim 1, further determining, based at least in part on the forecasted power needs and the power generation capabilities, can satisfy one or more power requirements for one or more critical loads.

7. The method of claim 1, further determining, based at least in part on the forecasted power needs and the power generation capabilities, can satisfy one or more power requirements for one or more non-critical loads.

8. The method of claim 1, further comprising providing the power stored in the energy storage device to one or more critical loads or one or more non-critical loads.

9. A computer-readable storage medium encoding computer executable instructions which, when executed by a processor, performs a method for distributing energy, the method comprising:
   receiving, at a microgrid, data from a plurality of data sources;
   analyzing the data to forecast power needs associated with the microgrid;
   determining power generation capabilities of the microgrid;
   determining, based at least in part, on the forecasted power needs and the generation capabilities, whether the microgrid produces enough power to satisfy power requirements of one or more loads, the one or more loads being arranged in a hierarchy;
   when it is determined that the microgrid can satisfy power requirements of the one or more loads, determining whether a parent microgrid or a child microgrid is requesting power from the microgrid;
   when it is determined that the parent microgrid or the child microgrid is requesting power, determining, based at least in part, on the forecasted power needs and the generation capabilities, whether the microgrid should provide power to the one or more of the requesting parent microgrid or the requesting child microgrid; and
   when it is determined that the microgrid should provide power, providing power from the microgrid to the one or more of the requesting parent microgrid or the requesting child microgrid.

10. The computer-readable storage medium of claim 9, wherein the one more loads comprise critical loads and non-critical loads.

11. The computer-readable storage medium of claim 9, wherein determining power generation capabilities of the microgrid comprises a real-time determination of power generation capabilities.

12. The computer-readable storage medium of claim 9, further comprising instructions for causing the microgrid to connect to the parent microgrid or the child microgrid when the microgrid provides power to the one or more of the parent microgrid or the child microgrid.

13. The computer-readable storage medium of claim 12, further comprising instructions for causing the microgrid to disconnect from the parent microgrid or the child microgrid when it is determined that the microgrid cannot satisfy power requirements of the one or more loads.

14. The computer-readable storage medium of claim 13, wherein the determination that the microgrid cannot satisfy power requirements of the one or more loads is based, at least in part, on the forecasted power needs and the generation capabilities.

15. A system comprising:
   a processor; and
   a memory coupled to the processor, the memory for storing instructions which, when executed by the processor, causes the process to perform a method for distributing energy, the method comprising:
      receiving, at a microgrid, data from a plurality of data sources;
      analyzing the data to forecast power needs associated with the microgrid;
      determining power generation capabilities of the microgrid;
      determining, based at least in part, on the forecasted power needs and the generation capabilities, whether the microgrid can provide power to one or more of a requesting parent microgrid, a requesting child microgrid, or a requesting subsystem;
      when it is determined that the microgrid can provide power, providing power from the microgrid to the one or more of the requesting parent microgrid, the requesting child microgrid or the requesting subsystem; and
      when it is determined that the microgrid cannot provide power, storing excess power generated by the microgrid in an energy storage device.

16. The system of claim 15, further comprising instructions for determining whether one or more of the requesting parent microgrid, the requesting child microgrid or the requesting subsystem is a critical load.

17. The system of claim 16, further comprising instructions for providing power to the critical load.

18. The system of claim 15, further comprising instructions for determining, based at least in part, on the forecasted power needs and the generation capabilities, whether the microgrid can satisfy one or more power requirements.

19. The system of claim 18, further comprising instructions for causing the microgrid to request power from one or more of the parent microgrid or the child microgrid when it is determined that the microgrid cannot satisfy one or more power requirements.

20. The system of claim 15, further comprising instructions for causing the microgrid to disconnect from one or more of the requesting parent microgrid, the requesting child microgrid, or the requesting subsystem when it is determined, based at least in part, on the forecasted power needs and the generation capabilities, that the microgrid cannot provide power to one or more of the requesting parent microgrid, the requesting child microgrid, or the requesting subsystem.

* * * * *